United States Patent
André et al.

(10) Patent No.: US 11,082,072 B2
(45) Date of Patent: Aug. 3, 2021

(54) COHERENT MULTI BAND PEAK DETECTION

(71) Applicant: Telefonaktiebolaget LM Ericsson (publ), Stockholm (SE)

(72) Inventors: Tore André, Älvsjö (SE); Marius Cismasu, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/636,400

(22) PCT Filed: Aug. 17, 2017

(86) PCT No.: PCT/SE2017/050827
§ 371 (c)(1),
(2) Date: Feb. 4, 2020

(87) PCT Pub. No.: WO2019/035749
PCT Pub. Date: Feb. 21, 2019

(65) Prior Publication Data
US 2020/0177215 A1    Jun. 4, 2020

(51) Int. Cl.
*H04B 1/00* (2006.01)
*H04L 27/26* (2006.01)
(52) U.S. Cl.
CPC ....... *H04B 1/0067* (2013.01); *H04L 27/2623* (2013.01)
(58) Field of Classification Search
CPC .................... H04B 1/0067; H04L 27/2623
See application file for complete search history.

(56) References Cited

U.S. PATENT DOCUMENTS

| 9,215,120 | B2 | 12/2015 | Rexberg et al. |
| 9,331,882 | B2 | 5/2016 | Fehri et al. |

(Continued)

FOREIGN PATENT DOCUMENTS

| CN | 102437994 A | 5/2012 |
| EP | 3029902 A1 | 6/2016 |

OTHER PUBLICATIONS

Tarn, Helen, et al., "3GPP LTE Digital Front End Reference Design," Xilinx, Application Note: Virtex-5 FPGA, XAPP1123, Version 1.0, Oct. 29, 2008, 87 pages.

(Continued)

*Primary Examiner* — Lester G Kincaid
*Assistant Examiner* — Maryam Soltanzadeh
(74) *Attorney, Agent, or Firm* — Withrow & Terranova, PLLC

(57) ABSTRACT

Systems and methods for detecting peaks in a multi-band transmit signal are disclosed. In some embodiments, a method of operation of a multi-band transmitter for detecting peaks in a multi-band transmit signal which includes multiple transmit signals on a respective multiple frequency bands includes receiving a first band input signal for a first frequency band of the multi-band transmit signal and at least one additional band input signal for a respective at least one additional frequency band of the multi-band transmit signal. The method also includes detecting a peak of a combination of the first band input signal and the at least one additional band input signal taking into account phase information of the first band input signal and the at least one additional band input signal. In this manner, the detected peak might not be overestimated as when the peak detection fails to take into account the phase information.

14 Claims, 16 Drawing Sheets

(56) References Cited

U.S. PATENT DOCUMENTS

| | | |
|---|---|---|
| 9,485,129 B1 | 11/2016 | Cope et al. |
| 2003/0086507 A1 | 5/2003 | Kim et al. |
| 2012/0320948 A1* | 12/2012 | McGowan .......... H04L 27/2624 |
| | | 375/133 |
| 2013/0027090 A1 | 1/2013 | Morris et al. |
| 2014/0169496 A1* | 6/2014 | Yang ........................ H03F 3/24 |
| | | 375/296 |

OTHER PUBLICATIONS

International Search Report and Written Opinion for International Patent Application No. PCT/SE2017/050827, dated May 18, 2018, 12 pages.

* cited by examiner

COHERENT MULTI BAND PEAK DETECTION

This application is a 35 U.S.C. § 371 national phase filing of International Application No. PCT/SE2017/050827, filed Aug. 17, 2017, the disclosure of which is incorporated herein by reference in its entirety.

TECHNICAL FIELD

The present disclosure relates to detecting peaks in a multiband signal.

BACKGROUND

As wireless networks continue to advance, base station transmitters and receivers are supporting wider bandwidths that include not only multiple carriers of a single radio format, but also multiple formats in one transmitter. Multi-Standard Radio (MSR) transmitters can simultaneously transmit different Radio Access Technologies (RATs) from a single unit. MSR transmitters suffer from high Peak-to-Average Ratio (PAR) values, i.e., high ratios between the peak and average power of the signal samples. This is a consequence of the Central Limit Theorem applicable when many signals are added together (e.g., multiple carriers—Global System for Mobile communication (GSM), Wide Band Code Division Multiple Access (WCDMA), Long Term Evolution (LTE), multiple sub-carriers, etc.). The resulting real and imaginary components of the signal will approach Gaussian distributions and the amplitude will approach a Rayleigh distribution. It is important to limit the PAR in order to get good efficiency of the Power Amplifier (PA).

The purpose of the Crest Factor Reduction (CFR) algorithm is to limit the PAR. A popular way to reduce the PAR is to limit the signal amplitude to a chosen threshold. However, this limiting results in out-of-band spectrum emissions (i.e., the clipping operation creates distortion to adjacent channels). A useful CFR algorithm must be able to limit the PAR and limit the out-of-band emissions without too much increase of the Error Vector Magnitude (EVM).

Peak Cancellation is a common CFR algorithm used today. Peak Cancellation is based on subtracting band limited pulses from the signal to be PAR-reduced. One such pulse is synchronized with the signal such that the maximum amplitude sample in the pulse occurs at the same time instant of the highest-amplitude sample in a peak train (i.e., the pulse maximum amplitude is aligned with a local maximum amplitude in the signal). Based on the relationship between these two maxima, the pulse is also scaled. This scaled pulse is subtracted from the signal and the result is a reduction of the local maximum amplitude, ideally to the set amplitude threshold. In order to cancel peaks, they must first be detected. As such, there is a need for improved detection of peaks in a multi-band transmit signal.

SUMMARY

Systems and methods for detecting peaks in a multi-band transmit signal are disclosed. In some embodiments, a method of operation of a multi-band transmitter for detecting peaks in a multi-band transmit signal which includes multiple transmit signals on respective multiple frequency bands includes receiving a first band input signal for a first frequency band of the multi-band transmit signal and receiving at least one additional band input signal for a respective at least one additional frequency band of the multi-band transmit signal. The method also includes detecting a peak of a combination of the first band input signal and the at least one additional band input signal taking into account phase information of the first band input signal and the at least one additional band input signal. In this manner, the detected peak might not be overestimated as when the peak detection fails to take into account the phase information.

In some embodiments, receiving the first band input signal includes receiving the first band input signal in a first Multi-Carrier Branch (MCB) of the multi-band transmitter and receiving the at least one additional band input signal includes receiving the at least one additional band input signal in a corresponding at least one additional MCB of the multi-band transmitter. In some embodiments, there is a separate Crest Factor Reduction (CFR) algorithm in each of the MCBs.

In some embodiments, the method also includes, prior to detecting the peak of the combined signal, upsampling the first band input signal. In some embodiments, upsampling the first band input signal includes upsampling the first band input signal by a factor of four. In some embodiments, receiving the at least one additional band input signal includes receiving the at least one additional band input signal already upsampled in the at least one additional MCB. In some embodiments, the method also includes upsampling the at least one additional band input signal.

In some embodiments, the method also includes, prior to detecting the peak of the combined signal, summing the first band input signal and the at least one additional band input signal to provide the combined signal that represents the combination of the first band input signal and the at least one additional band input signal that takes into account the phase information of the first band input signal and the at least one additional band input signal.

In some embodiments, the method also includes, prior to summing the first band input signal and the at least one additional band input signal, moving the first band input signal and the at least one additional band input signal to frequencies corresponding to a carrier frequency of each of the first band input signal and the at least one additional band input signal.

In some embodiments, prior to summing the first band input signal and the at least one additional band input signal, the method also includes moving the first band input signal and the at least one additional band input signal to frequencies with a frequency distance corresponding to a difference of the carrier frequencies of each of the combinations of the first band input signal and the at least one additional band input signal. In some embodiments, moving the first band input signal and the at least one additional band input signal includes moving the first band input signal and the at least one additional band input signal to symmetric locations with the frequency distance corresponding to the difference of the carrier frequencies of each of the combinations of the first band input signal and the at least one additional band input signal.

In some embodiments, the peak of the combination is less than a peak that would be determined for the first band input signal without taking into account the phase information.

In some embodiments, detecting the peak of the combination includes detecting the peak at a point in a signal chain prior to a point where a sample rate is high enough such that the first band input signal and the at least one additional band input signal can be combined.

In some embodiments, the multi-band transmitter is a Multi-Standard Radio (MSR) transmitter.

In some embodiments, a multi-band transmitter operative to transmit a multi-band transmit signal which includes multiple transmit signals on respective frequency bands includes a first input configured to receive a first band input signal for a first frequency band of the multi-band transmit signal and at least one additional input configured to receive at least one additional band input signal for a respective at least one additional frequency band of the multi-band transmit signal The multi-band transmitter also includes a peak detecting circuitry configured to detect a peak of a combination of the first band input signal and the at least one additional band input signal taking into account phase information of the first band input signal and the at least one additional band input signal.

In some embodiments, the first input is included in a first MCB and the at least one additional input is included in a corresponding at least one additional MCB. In some embodiments, the multiband transmitter also includes upsampling circuitry configured to upsample the first band input signal received by the first input.

In some embodiments, the multi-band transmitter also includes adding circuitry configured to sum the first band input signal and the at least one additional band input signal to provide the combined signal that represents the combination of the first band input signal and the at least one additional band input signal that takes into account the phase information of the first band input signal and the at least one additional band input signal.

In some embodiments, the multi-band transmitter also includes frequency translation circuitry configured to move the first band input signal and the at least one additional band input signal to frequencies corresponding to a carrier frequency of each of the first band input signal and the at least one additional band input signal prior to the first band input signal and the at least one additional band input signal entering the adding circuitry.

In some embodiments, the multi-band transmitter also includes frequency translation circuitry configured to move the first band input signal and the at least one additional band input signal to frequencies with a frequency distance corresponding to a difference of the carrier frequencies of each of the combinations of the first band input signal and the at least one additional band input signal prior to the first band input signal and the at least one additional band input signal entering the adding circuitry.

In some embodiments, the frequency translation circuitry is configured to move the first band input signal and the at least one additional band input signal to symmetric locations with the frequency distance corresponding to the difference of the carrier frequencies of each of the combinations of the first band input signal and the at least one additional band input signal.

In some embodiments, a multi-band transmitter for detecting peaks in a multi-band transmit signal which includes multiple transmit signals on respective frequency bands is adapted to receive a first band input signal to provide a first radio frequency signal for a first frequency band of the multi-band transmit signal; receive at least one additional band input signal for a respective at least one additional frequency band of the multi-band transmit signal; and detect a peak of a combination of the first band input signal and the at least one additional band input signal taking into account phase information of the first band input signal and the at least one additional band input signal.

In some embodiments, a multi-band transmitter for detecting peaks includes an input module and a peak detecting module. The input module is operable to receive a first band input signal for a first frequency band of the multi-band transmit signal and at least one additional band input signal for a respective at least one additional frequency band of the multi-band transmit signal. The peak detecting module is operable to detect a peak of a combination of the first band input signal and the at least one additional band input signal taking into account phase information of the first band input signal and the at least one additional band input signal.

In some embodiments, a method of operation of a multi-band transmitter for detecting peaks in a multi-band transmit signal which includes multiple transmit signals on respective frequency bands includes receiving a first band input signal and at least one additional band input signal for a respective at least one additional frequency band of the multi-band transmit signal. The method also includes determining whether to perform coherent peak detection or non-coherent peak detection based on a frequency distance corresponding to a difference of carrier frequencies of each of the combinations of a first band input signal and the at least one additional band input signal. In response to determining to perform the coherent peak detection, the method also includes detecting a peak of a combination of the first band input signal and the at least one additional band input signal taking into account phase information of the first band input signal and the at least one additional band input signal. In response to determining to perform the non-coherent peak detection, the method includes detecting the peak of the combination of the first band input signal and the at least one additional band input signal without taking into account phase information of the first band input signal and the at least one additional band input signal.

In some embodiments, determining whether to perform the coherent peak detection or the non-coherent peak detection includes determining to perform the coherent peak detection when the distance corresponding to the difference of the carrier frequencies of each of the combinations of the first band input signal and the at least one additional band input signal is less than a distance threshold value; and determining to perform non-coherent peak detection when the distance between the first band input signal and the at least one additional band input signal is not less than the distance threshold value.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
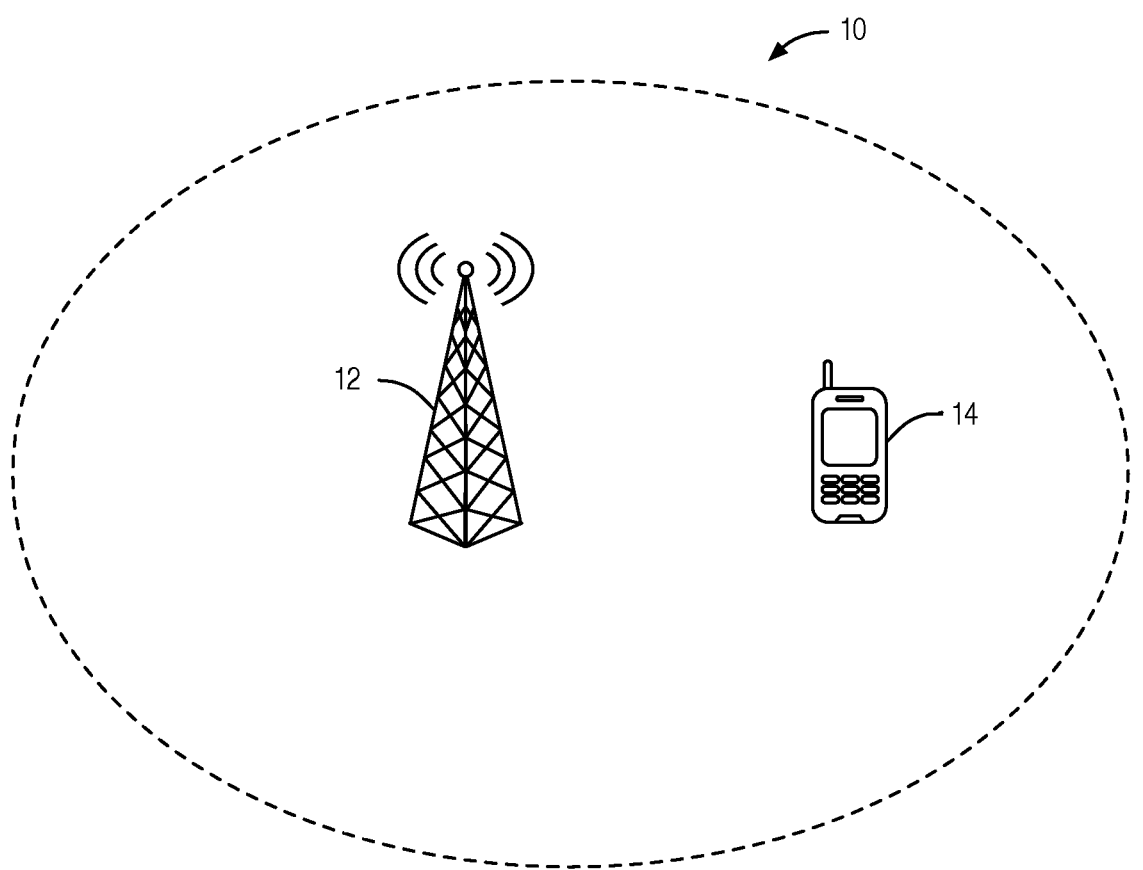
FIG. 1 illustrates an example wireless communications network according to some embodiments of the present disclosure.

The described embodiments may be implemented in any appropriate type of communication system supporting any suitable communication standards and using any suitable components. As one example, certain embodiments may be implemented in a cellular communication network 10 as shown in FIG. 1. This cellular communication network 10 includes multiple radio access nodes 12 (e.g., eNodeBs or other base stations) and multiple wireless devices 14 (e.g., conventional User Equipments (UEs), Machine Type Communication (MTC)/Machine-to-Machine (M2M) UEs, etc.). Radio access nodes 12 are capable of communicating with wireless communication devices 14 along with any additional elements suitable to support communication between wireless communication devices or between a wireless communication device and another communication device (such as a landline telephone).

In some embodiments, the radio access node 12 includes a multi-band transmitter such as a Multi-Standard Radio (MSR) transmitter which can simultaneously transmit different Radio Access Technologies (RATs) from a single unit. MSR transmitters suffer from high Peak-to-Average Ratio (PAR) values, i.e., a high ratio between the peak and average power of the signal samples. It is important to limit the PAR in order to get good efficiency of the Power Amplifier (PA).

Figure 2:
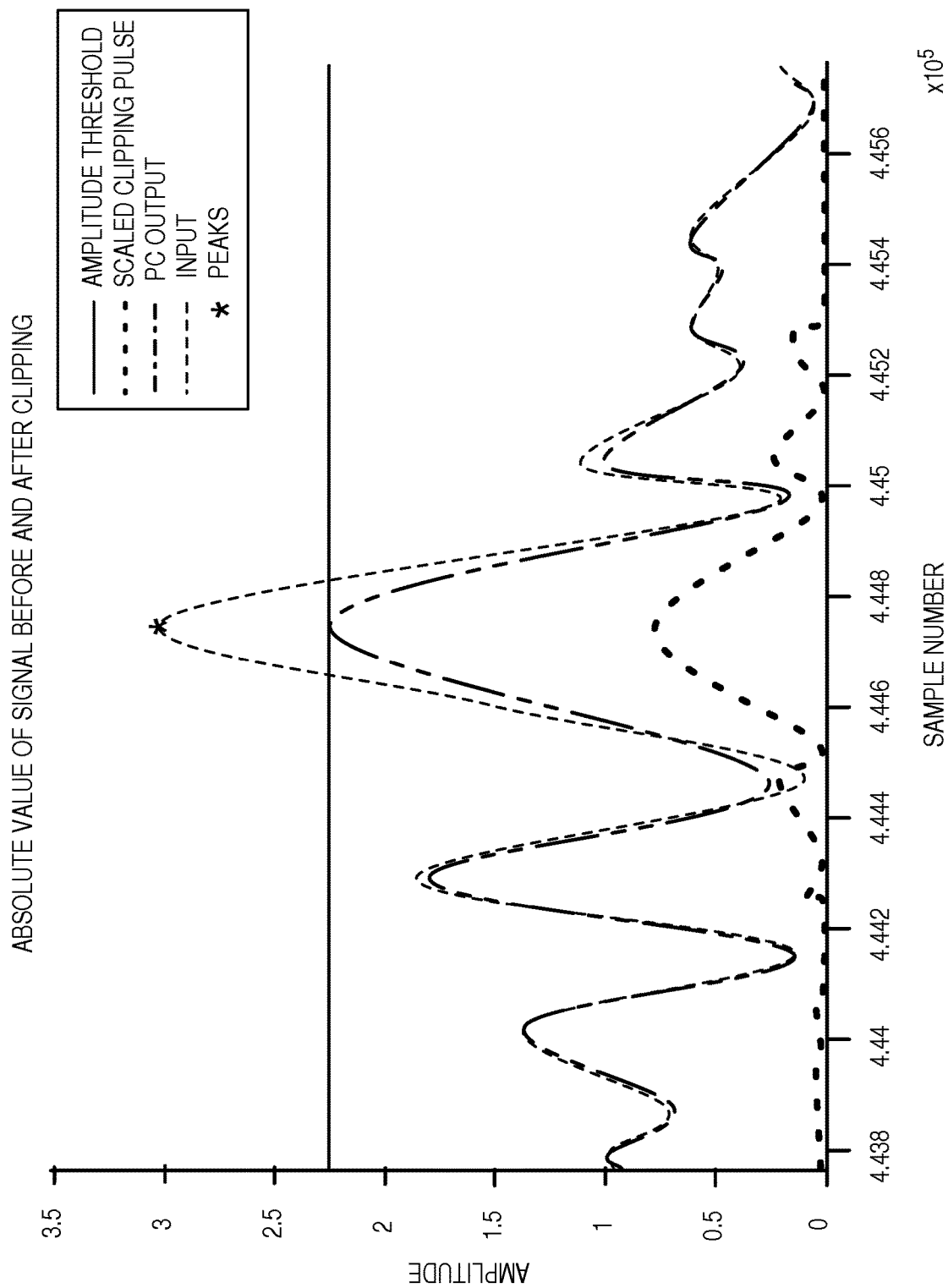
FIG. 2 illustrates the absolute value of a signal before and after clipping according to some embodiments of the present disclosure.

Peak Cancellation is a common Crest Factor Reduction (CFR) algorithm used today. Peak Cancellation is based on subtracting band limited pulses from the signal to be PAR-reduced. One such pulse is synchronized with the signal such that the maximum amplitude sample in the pulse occurs at the same time instant of the highest-amplitude sample in a peak train (i.e., the pulse maximum amplitude is aligned with a local maximum amplitude in the signal). Based on the relationship between these two maxima, the pulse is also scaled. This scaled pulse is subtracted from the signal and the result is a reduction of the local maximum amplitude, ideally to the set amplitude threshold. FIG. 2 illustrates the absolute value of a signal before and after clipping according to some embodiments of the present disclosure.

The band-limited pulse is the impulse response of the carrier filter. This pulse is stored in a memory (unscaled). In case of several carriers, the pulse is the summation of the impulse responses of all carrier filters, each modulated to the correct frequency within the multi-carrier frequency band. The clipping pulse can be generated in advance and is only dependent on carrier configuration.

In some embodiments, the signal to be PAR-reduced needs to be processed a few times sequentially (e.g., the signal is clipped in two to four consecutive stages that perform almost the same operations on the signal but with differently scaled clipping pulses added at different time instants). This iterative implementation is required due to the peak regrowth that occurs when adding pulses and due to the limited temporal extent of the effect of a clipping pulse (i.e., a pulse can only cancel a limited number of samples; adding more overlapping pulses in the same stage, however, may reduce PAR but has the side effect that Error Vector Magnitude (EVM) worsens). In some embodiments, the signal also must be delayed in order to achieve alignment between the maximum-amplitude sample in the clipping pulse and a local signal maximum because the pulse maximum is usually one of the samples in the middle of the pulse time extent.

In order to cancel peaks, they must first be detected. The purpose of the peak extraction is to identify all samples that have an absolute value above the threshold. For Peak Cancellation it is also necessary to identify the largest sample in each peak (group of samples above the threshold). This is called Peak Detection. In some embodiments, this sample is the only value that is used for the cancellation to adjust the pulse phase and amplitude.

Figure 3:
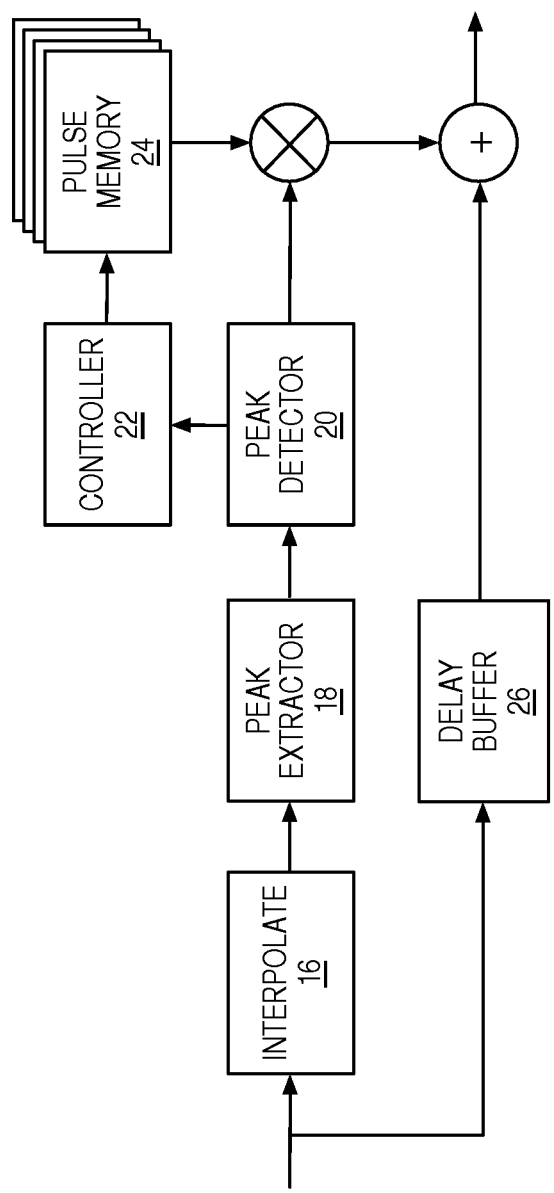
FIG. 3 illustrates an example circuit for clipping peaks in a signal, according to some embodiments of the present disclosure.

FIG. 3 illustrates an example circuit for clipping peaks in a signal, according to some embodiments of the present disclosure. FIG. 3 includes an interpolator 16, a peak extractor 18, and a peak detector 20. FIG. 3 also includes a controller 22 that uses the detected peaks to control the clipping pulses stored in pulse memory 24. These clipping pulses are multiplied by the detected peaks as discussed above. FIG. 3 also shows that the original signal is delayed in a delay buffer 26 and then added to clipping pulses in order to reduce the peaks.

In Peak Cancellation it is very important to detect the true peak, i.e., the peak that appears at the reconstruction of the analog signal after a digital-to-analog converter and a reconstruction filter. If the signal is sampled with insufficiently high sample rate, there is a risk that the true peak is missed because the peak falls between samples. Usually this is handled by oversampling i.e. using a sample frequency that is in some embodiments four times higher than the Nyquist frequency. However, it is only required to use the higher sample rate in the detector. The multiplication and addition of the clipping pulse can be done at the normal sample frequency (without oversampling) provided that a set of pulses are stored, each with different sample timings. In some embodiments, instead of storing these pulses, they could be generated at the time they are needed. The Peak detector determines, dependent of the peak position, which subsampled version of the filter that shall be used.

For example, with four times over-sampling, there are four pulse versions stored in a memory. The difference between these versions is that when upsampled four times, the maximum amplitudes of these pulses occur at four consecutive time instants, the Peak Detector having the task of finding the most appropriate position of the upsampled maximum.

Figure 4:
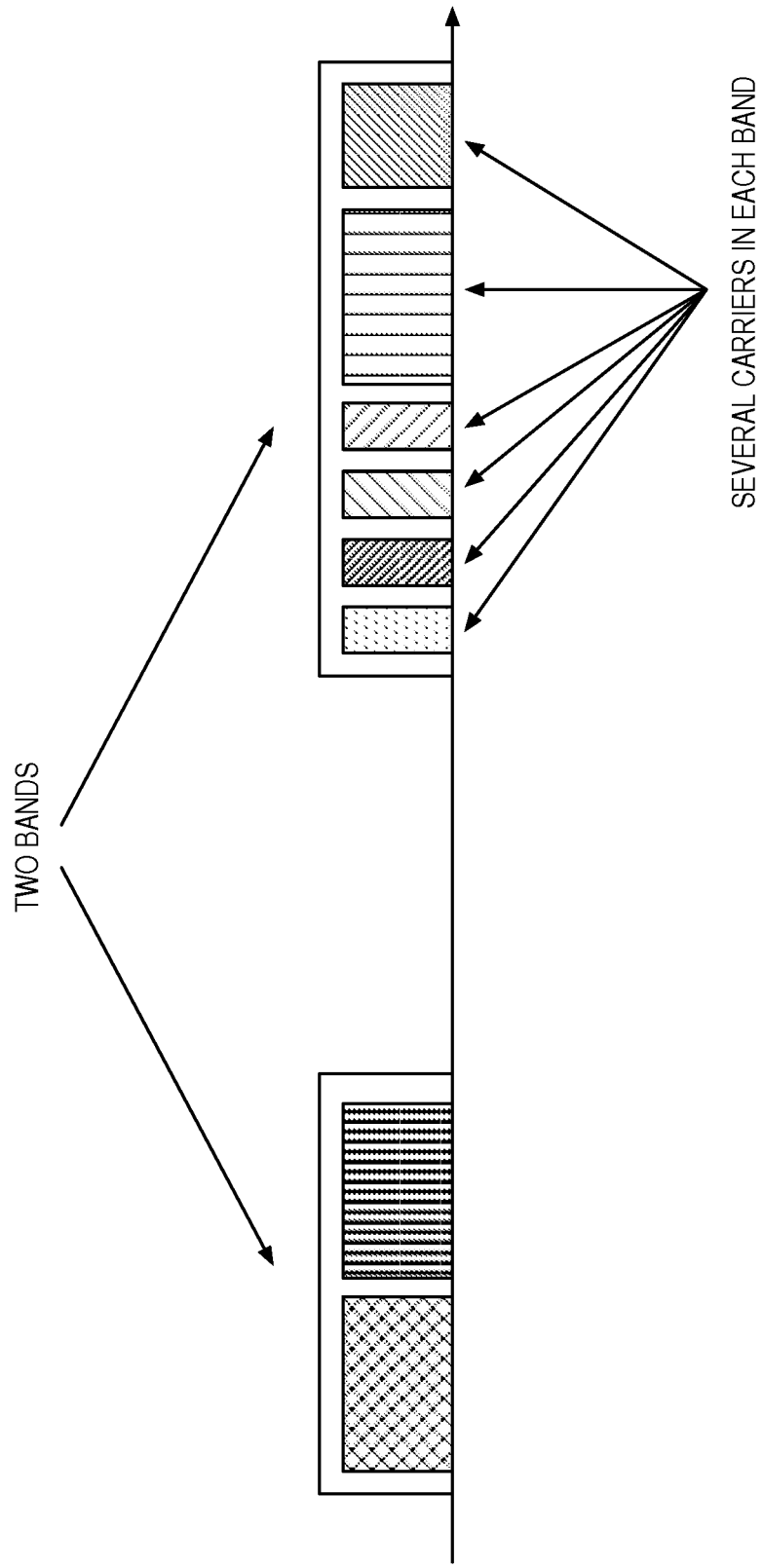
FIG. 4 illustrates a multi-band signal where each band may have several carriers in each band according to some embodiments of the present disclosure.

FIG. 4 illustrates a multi-band signal where each band may have several carriers in each band according to some embodiments of the present disclosure. A band includes one or several carriers as illustrated in FIG. 4. The bands are usually separated with a larger frequency distance than the distance between carriers within a band. A band is handled in the radio by a Multi-Carrier Branch (MCB).

Figure 5:
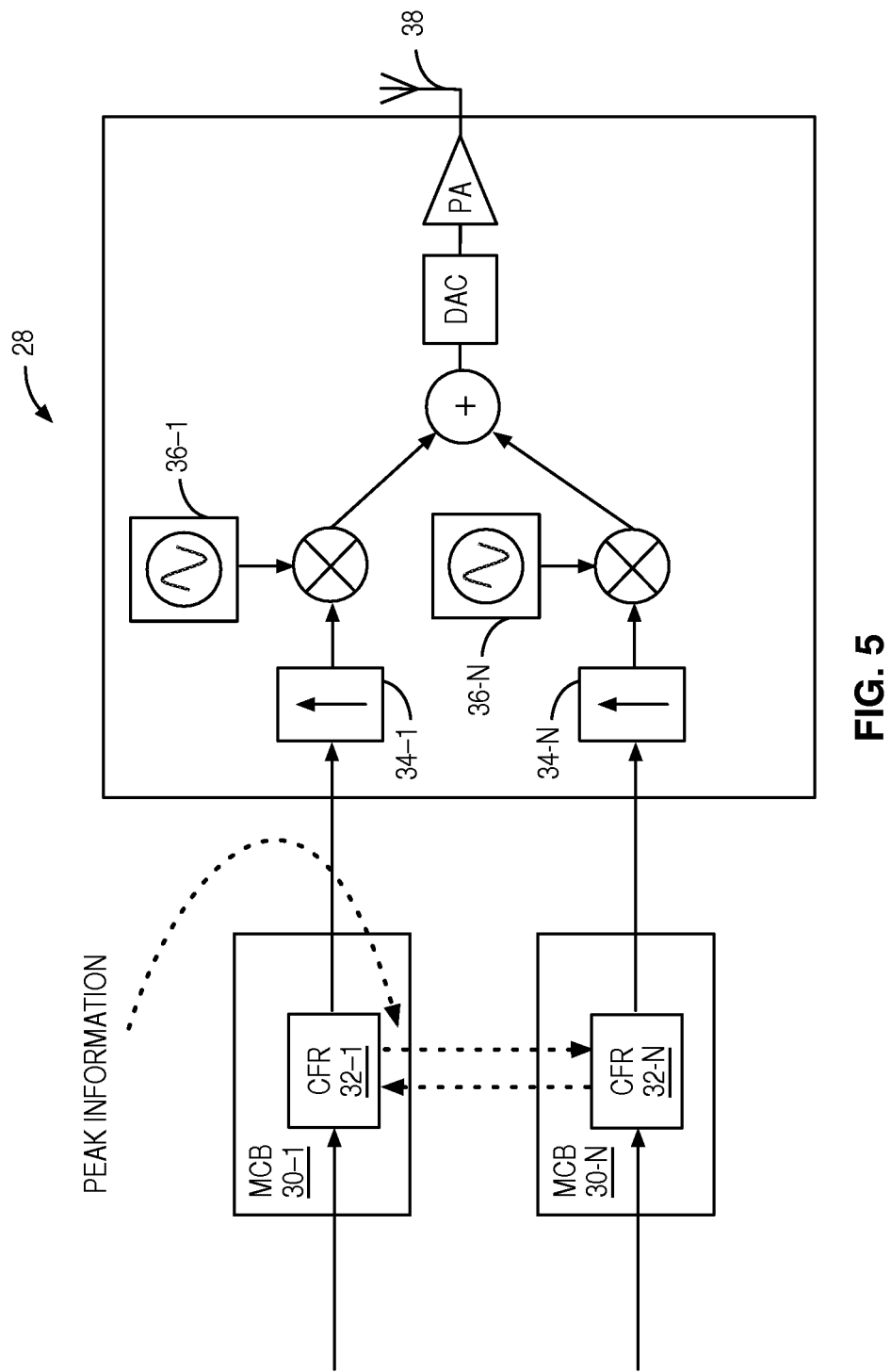
FIG. 5 illustrates a multi-band transmitter with several Multi-Carrier Branches (MCBs) each with its own Crest Factor Reduction (CFR) block according to some embodiments of the present disclosure.

Typically, a radio handles one band, but it is sometimes desirable to support several bands using the same radio. FIG. 5 illustrates a multi-band transmitter 28 with several MCBs 30-1 through 30-N. The bands might be separated in frequency with a distance that, due to limited sample frequency, makes it impossible to handle in one MCB 30. In those cases, it is required to use several CFRs 32-1 through 32-N, one for each band. The bands could be added together later in the signal chain where the sample rate is higher.

As shown in FIG. 5, after the signals leave the CFRs 32-1 through 32-N, the signals are upsampled by upsamplers 34-1 through 34-N. The signals are then mixed with the appropriate frequency generated by oscillators 36-1 through 36-N to move the signals to the correct location for transmission. At this point in some embodiments, the signals are added together and sent to one or more antennas 38 for transmission.

Figure 6:
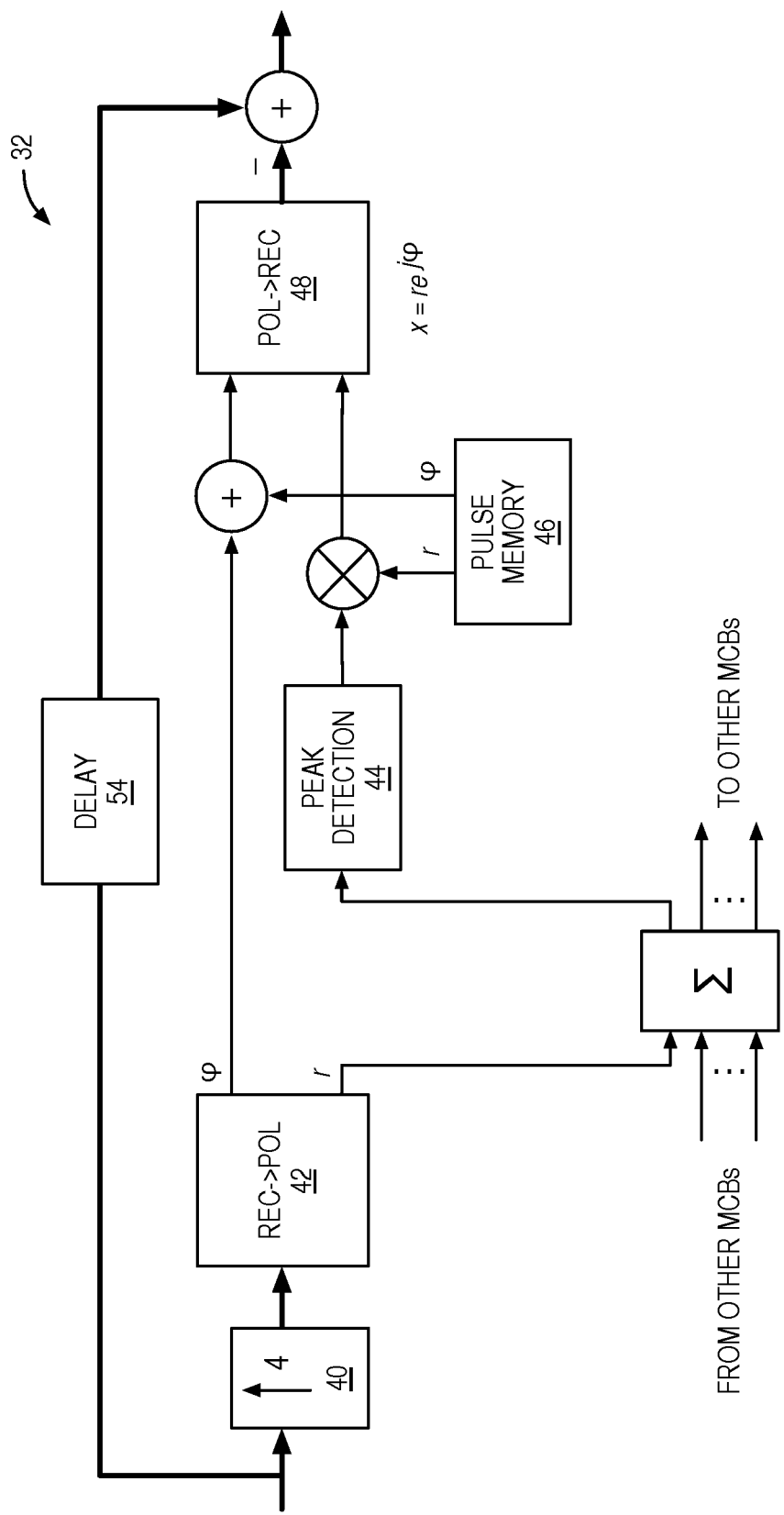
FIG. 6 illustrates the operation of a CFR block as in FIG. 5 where the peaks are detected in a non-coherent way without taking into account phase information according to some embodiments of the present disclosure.

If each band is clipped separately, there will be a major peak regrowth when the signals are later added. The problem is that each CFR has no knowledge about the peaks in the other bands. FIG. 6 illustrates the operation of a CFR block 32 as in FIG. 5 where the peaks are detected in a non-coherent way without taking into account phase information according to some embodiments of the present disclosure. In this example, not taking into account phase information means only using the absolute values of the signals.

If all CFR blocks 32 had knowledge of the instantaneous absolute value of all the other bands, extra clipping could be applied when signal levels in several bands are high simultaneously. This can be achieved by distributing the absolute value of all bands to all other clipping blocks and adding those absolute values together in each CFR 32. In some embodiments, these values can be added somewhere else and then the sum can be distributed to each CFR 32. This total added signal is then used instead of the absolute value of each band separately. This is shown in FIG. 6 where the signal is upsampled by upsampler 40 before being converted to an absolute value by using rectangular to polar converter 42. This absolute value is then combined with the absolute values from other MCBs 30 before entering a peak detection module 44. As above, a clipping pulse is obtained from a pulse memory 46 to effect the desired clipping of the current signal. The signal is then converted back to rectangular coordinates by the polar to rectangular converter 48.

The propagation of the absolute value of the band signal to other CFR blocks 32 for joint multi-band clipping is referred to herein as non-coherent peak estimation. This method is efficient when the bands are separated with a sufficiently large distance. As used herein, sufficiently large means a band separation greater than the bandwidth of either of the bands. In these cases, the phase difference between the bands is changing very rapidly, more rapidly than the amplitude of the combined signal changes. Therefore, it suffices to approximate the absolute value of the summed signals with the sum of the absolute values of each signal.

However, by not considering the phases of the input signals, the amplitude of the combined bands signal is overestimated as if the individual bands were added in phase (phase difference zero between band samples). This overestimated peak on the combined bands results in too much clipping of the band signals which leads to increased error in clipping, i.e., EVM.

A potential solution to this would be to place a CFR block 32 later in the signal chain where the individual bands are combined into one signal. However, at this point in the processing, the sampling rate is a few times higher, in some embodiments, four times higher, throughout the entire CFR block. An increase in the sampling rate in the memory management parts of the CFR leads to a significant increase in the chip area and power consumption of this block. Therefore, there is a need for improved detection of peaks in a multi-band transmit signal.

Systems and methods for detecting peaks in a multi-band transmit signal are disclosed. In some embodiments, a method of operation of a multi-band transmitter 28 for detecting peaks in a multi-band transmit signal which includes multiple transmit signals on respective multiple frequency bands includes receiving a first band input signal for a first frequency band of the multi-band transmit signal and receiving at least one additional band input signal for a respective at least one additional frequency band of the multi-band transmit signal. The method also includes detecting a peak of a combination of the first band input signal and the at least one additional band input signal taking into account phase information of the first band input signal and the at least one additional band input signal. In this manner, the detected peak might not be overestimated as when the peak detection fails to take into account the phase information.

Figure 7:
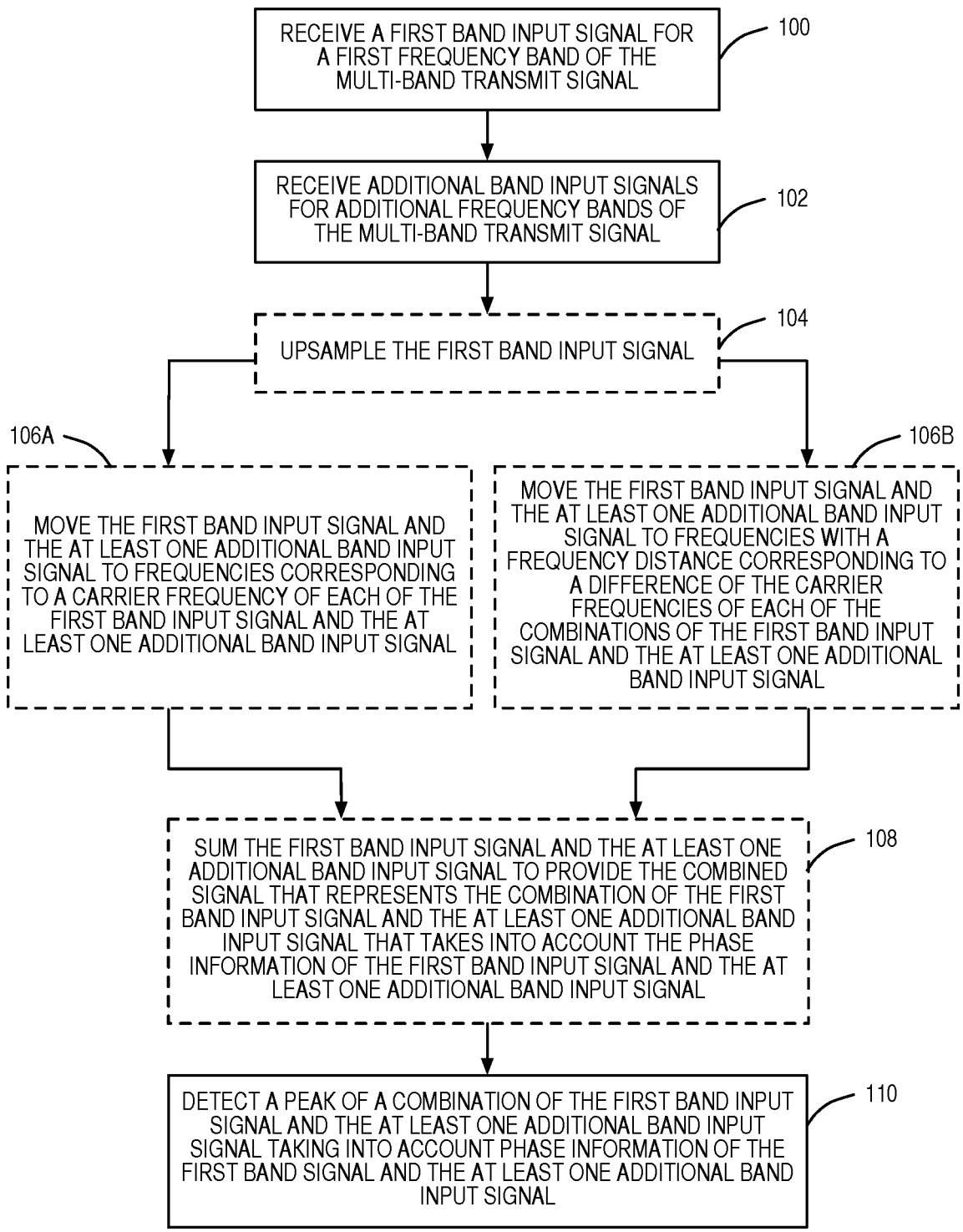
FIG. 7 illustrates a method of operation of a multi-band transmitter for detecting peaks in a multi-band transmit signal which includes multiple transmit signals on respective multiple frequency bands taking into account phase information of the band input signals according to some embodiments of the present disclosure.

FIG. 7 illustrates a method of operation of a multi-band transmitter 28 for detecting peaks in a multi-band transmit signal which includes multiple transmit signals on respective multiple frequency bands taking into account phase information of the band input signals according to some embodiments of the present disclosure.

First, the multi-band transmitter 28 receives a first band input signal for a first frequency band of the multi-band transmit signal (step 100). The multi-band transmitter 28 also receives at least one additional band input signal for a respective at least one additional frequency band of the multi-band transmit signal (step 102). In some embodiments, the first band input signal is upsampled (step 104). In some embodiments, the at least one additional band input signal is also upsampled as part of Step 104. In other embodiments, the at least one additional band input signal is upsampled before being received in Step 102. In some embodiments, upsampling includes upsampling the signal by a factor of four.

As discussed in more detail below in relation to FIGS. 10 and 11, in some embodiments, the first band input signal and the at least one additional band input signal are moved to frequencies corresponding to a carrier frequency of each of the first band input signal and the at least one additional band input signal (step 106A). In some embodiments, the first band input signal and the at least one additional band input signal are moved to frequencies with a frequency distance corresponding to a difference of the carrier frequencies of each of the combinations of the first band input signal and the at least one additional band input signal (step 106B). In some embodiments, this includes moving the first band input signal and the at least one additional band input signal to symmetric locations with the frequency distance corresponding to the difference of the carrier frequencies of each of the combinations of the first band input signal and the at least one additional band input signal.

Next, in some embodiments, the multi-band transmitter 28 sums the first band input signal and the at least one additional band input signal to provide the combined signal that represents the combination of the first band input signal and the at least one additional band input signal that takes into account the phase information of the first band input signal and the at least one additional band input signal (step 108). In some embodiments, these values can be added somewhere else and then the sum can be distributed to each CFR 32.

Then, the multi-band transmitter 28 detects a peak of a combination of the first band input signal and the at least one additional band input signal taking into account phase information of the first band input signal and the at least one additional band input signal (step 110). This method of joint multi-band clipping is referred to herein as coherent peak estimation. In this manner, the detected peak might not be overestimated as when the peak detection fails to take into account the phase information.

In some embodiments, the phases of the individual band signals are estimated at the point in the signal chain where the sample rate is high enough such that multiple bands can be combined. The complex valued (with phase information from the previously mentioned estimation) band signals are added. This added signal is a closer approximation of the resulting combined-band signal (with higher sample rate). Coherent addition of band signals significantly improves the performance of the CFR algorithm in those situations when over-clipping due to an incorrect estimate of the combined-band signal may occur, e.g., when bands are close in frequency. In some embodiments, to perform the coherent addition, the band signals must be upsampled and moved to their correct frequency, or be separated by the correct frequency distance as discussed below in relation to FIGS. 10 and 11. As the upsampled signal is already available in the peak detector, the only extra operation is to frequency translate them and then add them. The true phase and amplitude of the final signal can be calculated, as well as the true peak, causing a high PAR at the PA.

As the oversampling is also intended to be used for detecting peaks between samples it may not be possible to utilize all the available bandwidth of the oversampled signal. In some embodiments, there is a tradeoff between the benefit of coherent peak estimation and the benefit of a large oversampling factor. When moving the bands, it may be advantageous to move them to a symmetric position as only the frequency difference is important. This may minimize the impact from reduced oversampling.

Embodiments of coherent peak detection disclosed herein offer superior performance for multi band CFR of bands close in frequency. In fact, the performance of coherent peak estimation approaches the performance of a single CFR run on the combined bands signal as the frequency distance between the bands decreases. The additional implementation cost for the coherent methods is rather small as all blocks are reused from previous designs in some embodiments.

Furthermore, the solution disclosed here can be directly employed in products designed to support larger bandwidths with multiple signal processing chains of smaller individual bandwidths, e.g., 2N MHz carriers with N MHz signal processing chains.

Figure 8:
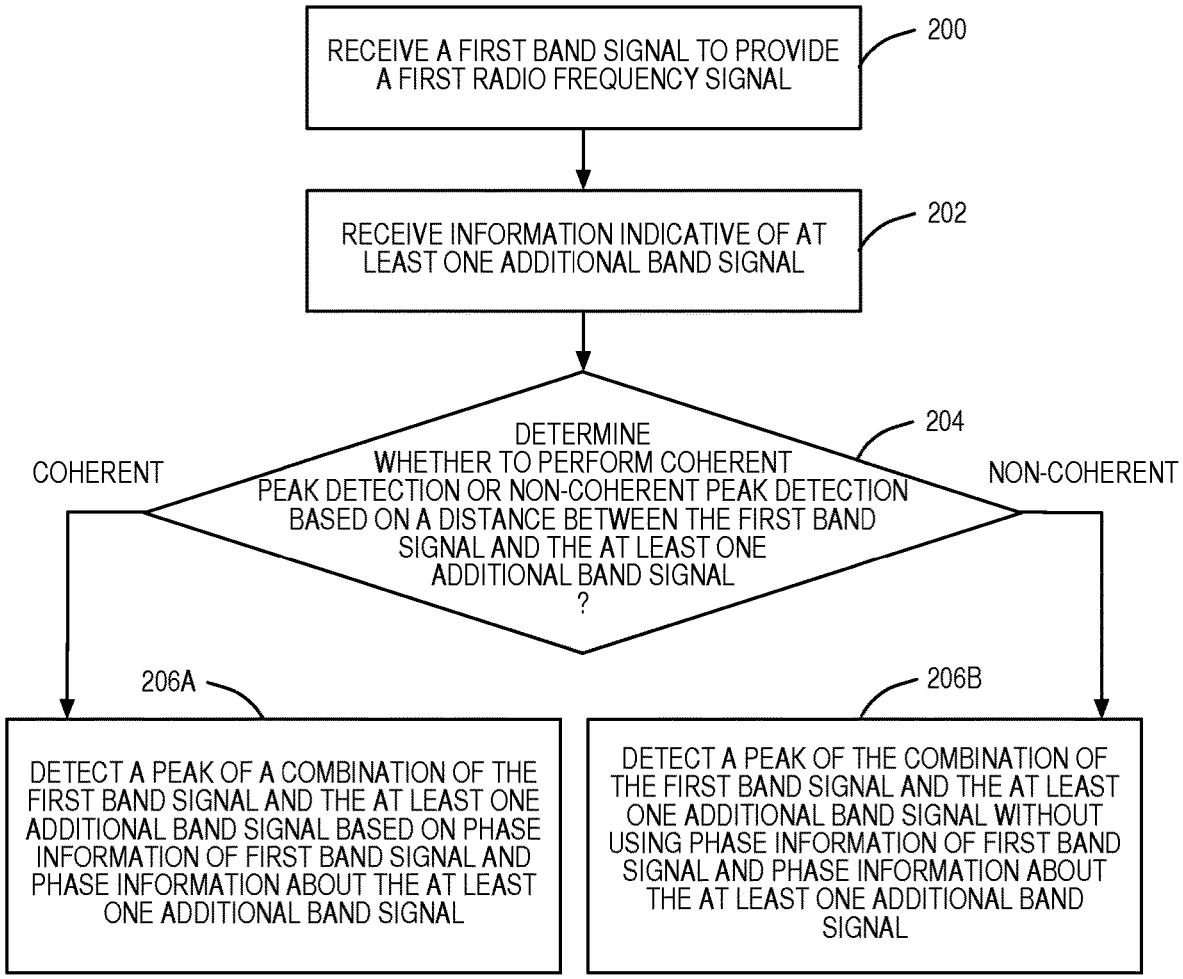
FIG. 8 illustrates a method of operation of a multi-band transmitter for detecting peaks in a multi-band transmit signal which includes determining whether to perform coherent peak detection or non-coherent peak detection according to some embodiments of the present disclosure.

However, in some scenarios, coherent peak detection may not be needed. FIG. 8 illustrates a method of operation of a multi-band transmitter 28 for detecting peaks in a multi-band transmit signal, which includes determining whether to perform coherent peak detection or non-coherent peak detection according to some embodiments of the present disclosure.

First, the multi-band transmitter 28 receives a first band input signal and at least one additional band input signal for a respective at least one additional frequency band of the multi-band transmit signal (steps 200 and 202). Next, the multi-band transmitter 28 determines whether to perform coherent peak detection or non-coherent peak detection based on a frequency distance corresponding to a difference of carrier frequencies of each of the combinations of the first band input signal and the at least one additional band input signal (step 204). In some embodiments, determining to perform the coherent peak detection when the distance corresponding to the difference of the carrier frequencies of each of the combinations of the first band input signal and the at least one additional band input signal is less than a distance threshold value. In some embodiments, the distance threshold value is a bandwidth of one of the bands or a function of a bandwidth of one of the bands.

If the multi-band transmitter 28 determines to perform coherent peak detection, the multi-band transmitter 28 detects a peak of a combination of the first band input signal and the at least one additional band input signal taking into account phase information of the first band input signal and the at least one additional band input signal (step 206A). Otherwise, the multi-band transmitter 28 detects the peak of the combination of the first band input signal and the at least one additional band input signal without taking into account phase information of the first band input signal and the at least one additional band input signal (step 206B).

Figure 9:
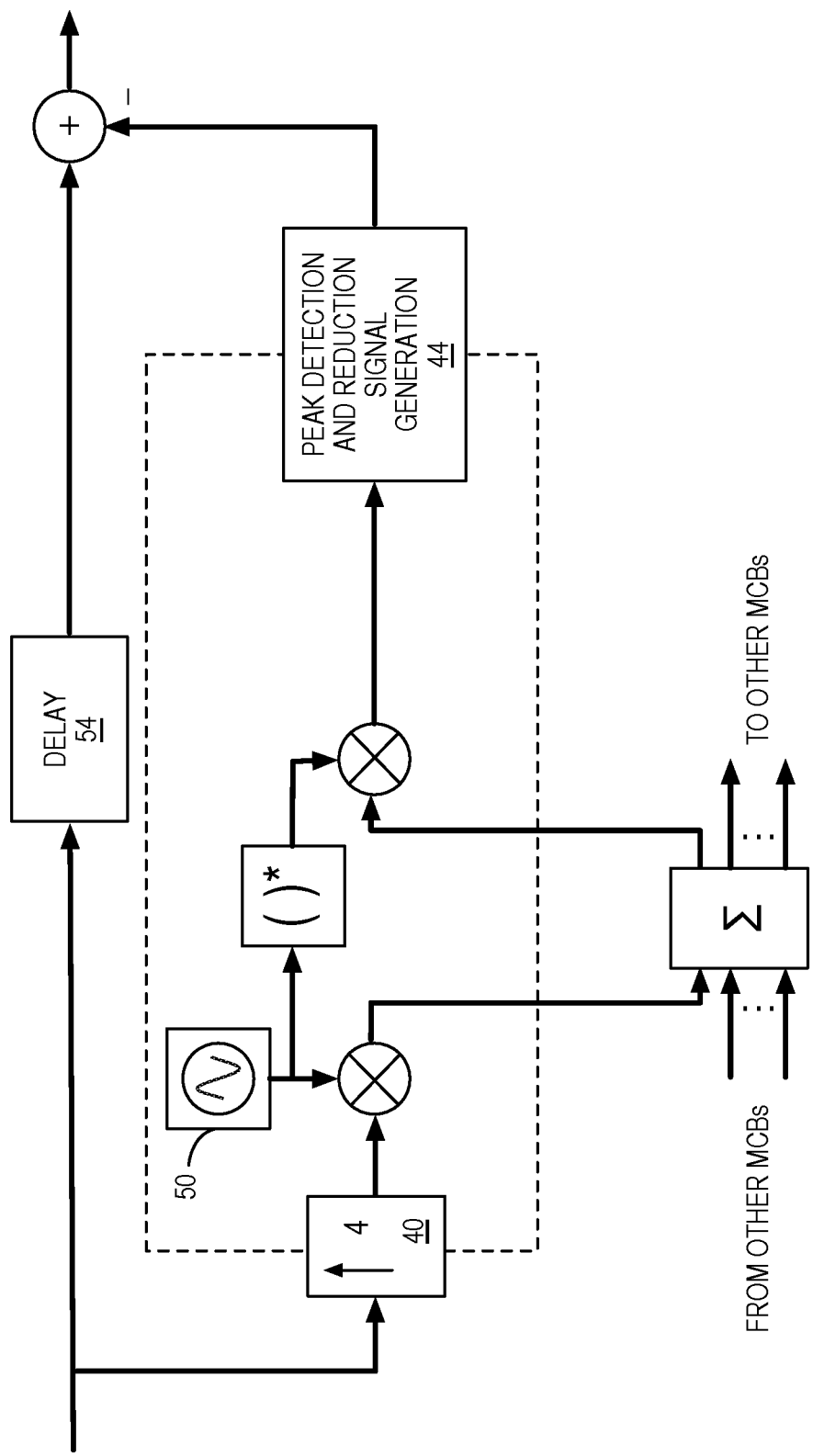
FIG. 9 illustrates the operation of a CFR block as in FIG. 5 where the peaks are detected in a coherent way by taking into account phase information according to some embodiments of the present disclosure.

FIG. 9 illustrates the operation of a CFR block 32 as in FIG. 5 where the peaks are detected in a coherent way by taking into account phase information according to some embodiments of the present disclosure. The input band signal is first upsampled by upsampler 40 and mixed with a frequency from oscillator 50. The frequency that the signal is moved to depends on the implementation as discussed above in relation to Steps 106A and 106B. The signal is then added coherently to the signals from the other MCBs 30 before being sent to the peak detection module 44. Since these signals are added taking into account the phase information, the peak may be lower and more accurate than would have been determined with a non-coherent method.

In this example, the peak detection module 44 may also generate the appropriate signals to subtract from the input signal provided by delay 54. In some embodiments, these signals correspond to any algorithm where a compensation signal is subtracted from the input signal to reduce the peaks. In some embodiments, this may be a clipping pulse to effect the desired clipping of the current signal. In some embodiments, this signal can be generated using e.g., a clip and filter algorithm.

Figure 10:
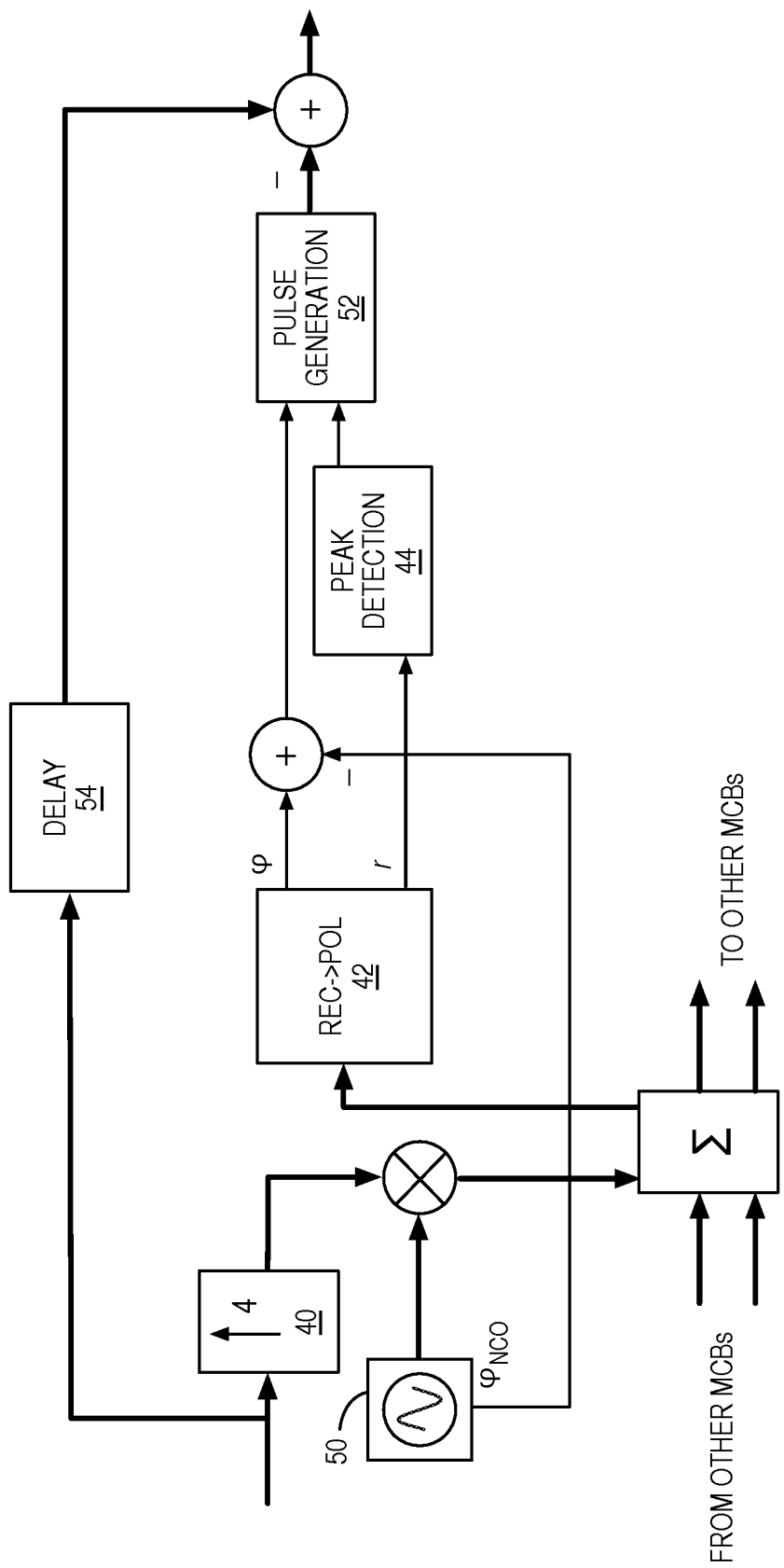
FIG. 10 illustrates the operation of a CFR block as in FIG. 5 where the peaks are detected in a coherent way by taking into account phase information according to some embodiments of the present disclosure.

FIG. 10 illustrates the operation of a CFR block 32 as in FIG. 5 where the peaks are detected in a coherent way by taking into account phase information according to some embodiments of the present disclosure. The input band signal is first upsampled by upsampler 40 and mixed with a frequency from oscillator 50. The frequency that the signal is moved to depends on the implementation as discussed above in relation to Steps 106A and 106B. The signal is then added coherently to the signals from the other MCBs 30 before being converted to an absolute value by using rectangular to polar converter 42. The use of the rectangular to polar converter 42 is merely an example implementation and the current disclosure is not limited thereto. Since these signals are added taking into account the phase information, the peak may be lower and more accurate than would have been determined with a non-coherent method.

The combined signal is then sent to the peak detection module 44. As above, a clipping pulse is obtained from a pulse generator 52 to effect the desired clipping of the current signal. The use of this peak cancellation technique is merely an example implementation and the current disclosure is not limited thereto. As shown in FIG. 10, this signal is then combined with a delayed version of the signal from delay 54. As discussed above, this may be used to align the clipping pulse with the peak of the signal.

Figure 11:
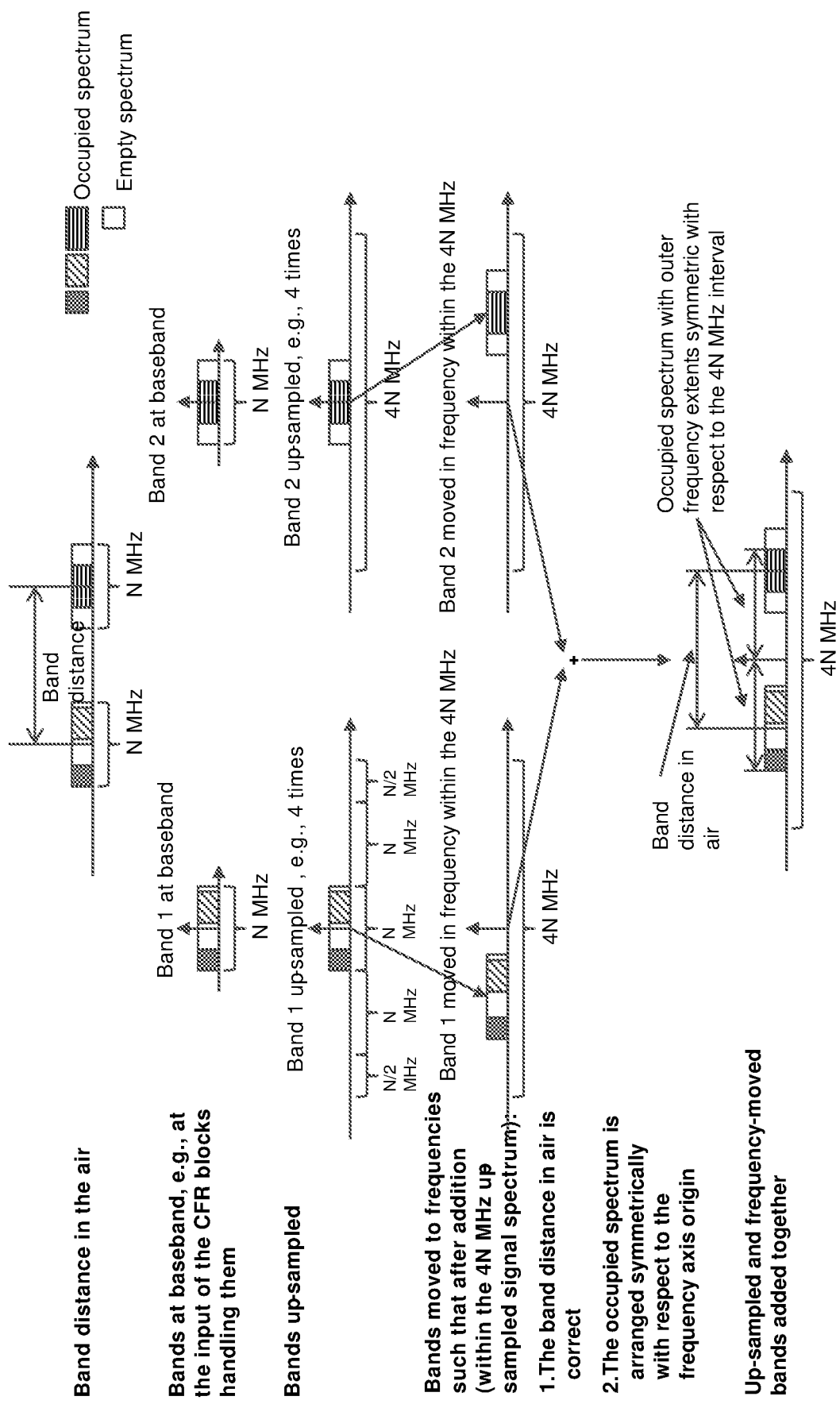
FIG. 11 illustrates how multiple band input signals can be upsampled and moved prior to peak detection according to some embodiments of the present disclosure.

FIG. 11 illustrates how multiple band input signals can be upsampled and moved prior to peak detection according to some embodiments of the present disclosure. The illustrated band distance in the air is a frequency distance corresponding to a difference of the carrier frequencies of each of the combinations of the first band input signal and the at least one additional band input signal. In this case, the band distance is the distance between band 1 and band 2. The input signals are at baseband and they are upsampled. Then, the signals are moved to the correct distance. However, since the distance is important and not the absolute location of the bands, FIG. 11 illustrates that they are placed symmetrically.

Figure 12:
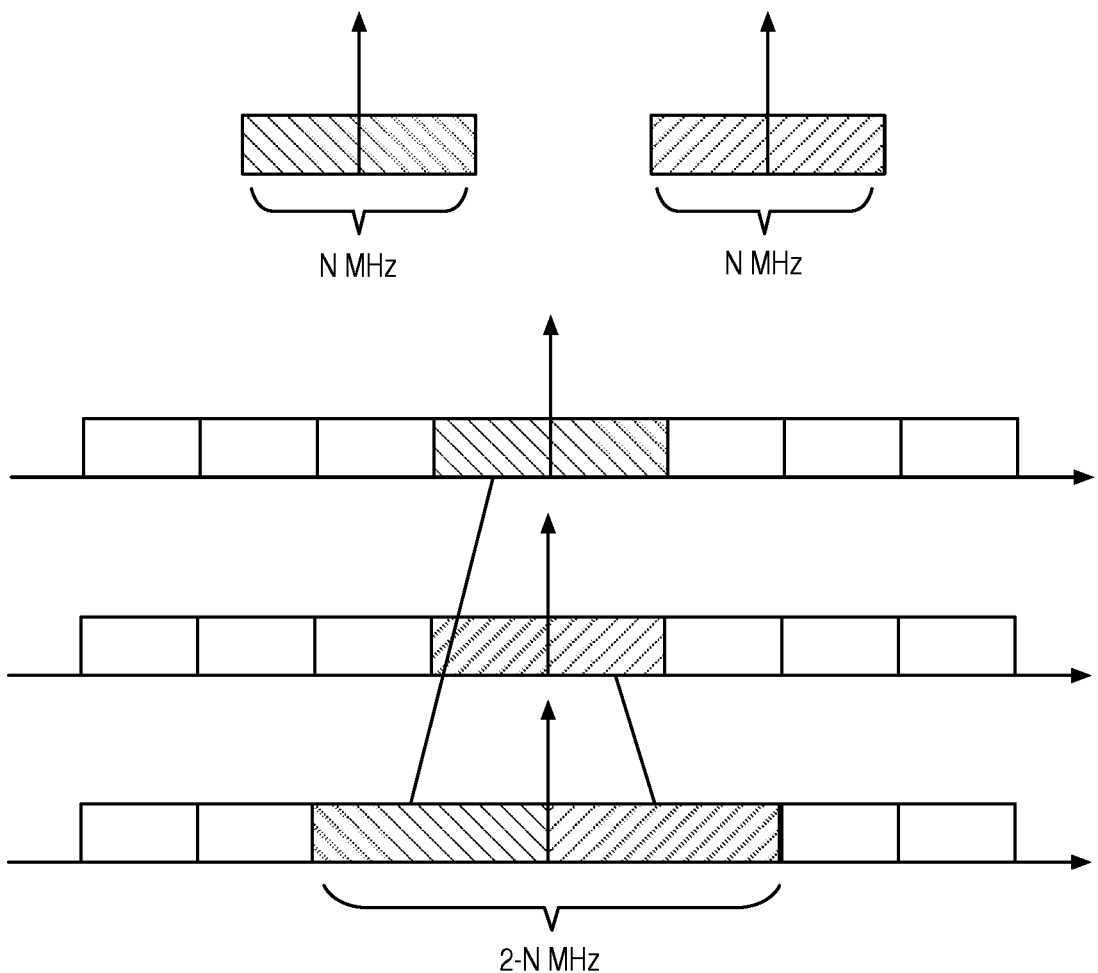
FIG. 12 illustrates how a large band signal can be treated as multiple band input signals according to some embodiments of the present disclosure.

FIG. 12 illustrates how a large band signal can be treated as multiple band input signals according to some embodiments of the present disclosure. Coherent peak estimation gives the greatest performance improvement when the bands to be handled by a radio are wider than the bandwidth of a single CFR block.

Figure 13:
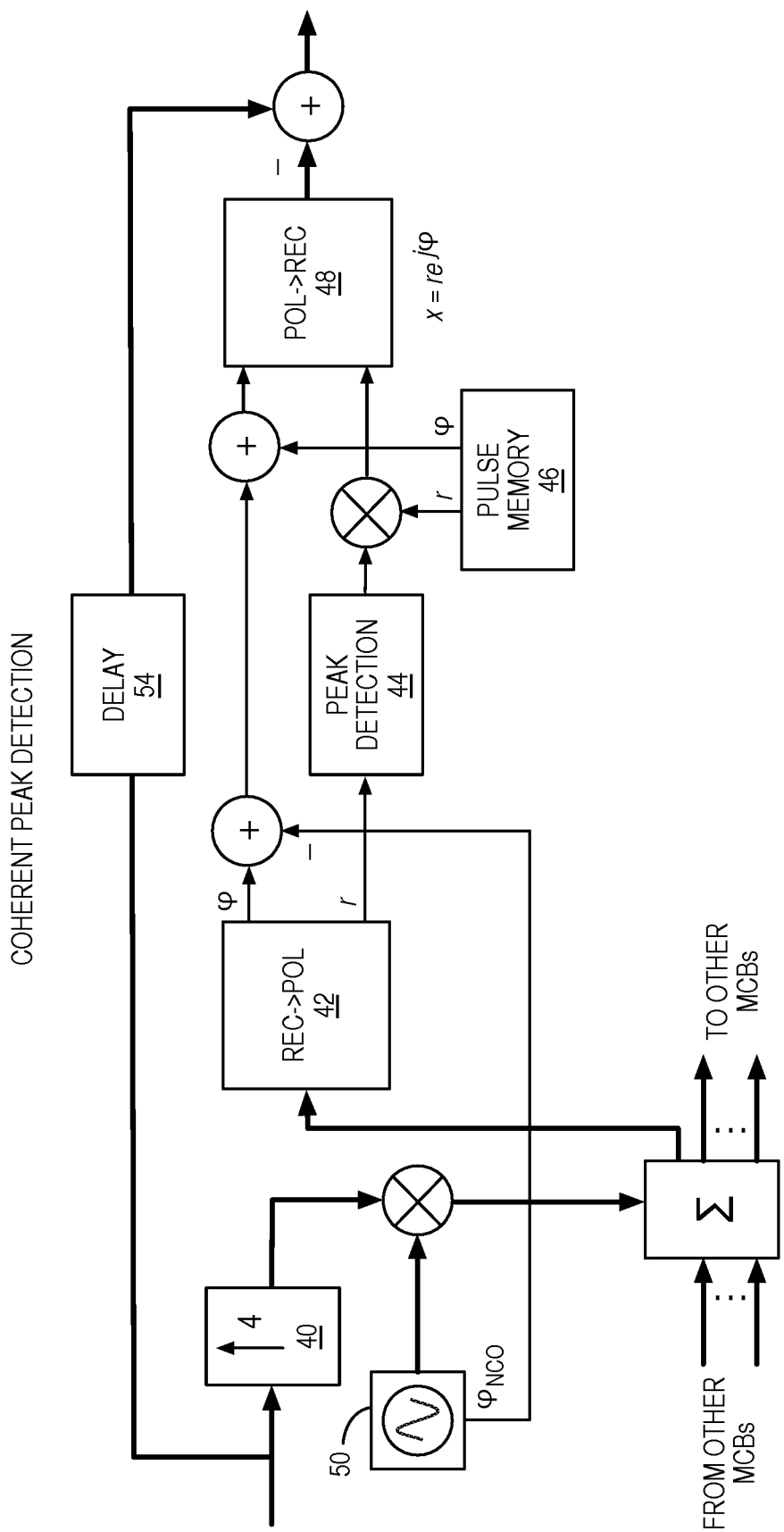
FIG. 13 illustrates another operation of a multi-band transmitter where the peaks are detected in a coherent way by taking into account phase information according to some embodiments of the present disclosure.

FIG. 13 illustrates another operation of a multi-band transmitter 28 where the peaks are detected in a coherent way by taking into account phase information according to some embodiments of the present disclosure. The like numbered elements have the same or similar function as previously discussed. This circuit illustrates the coherent peak detection which includes upsampling by upsampler 40 before moving the signals with the oscillator 50, which in this figure is a Numerically Controlled Oscillator (NCO). The moved input signals are then added prior to the rectangular to polar converter 42. This coherent addition allows the coherent peak detection to more accurately detect the peak.

Figure 14:
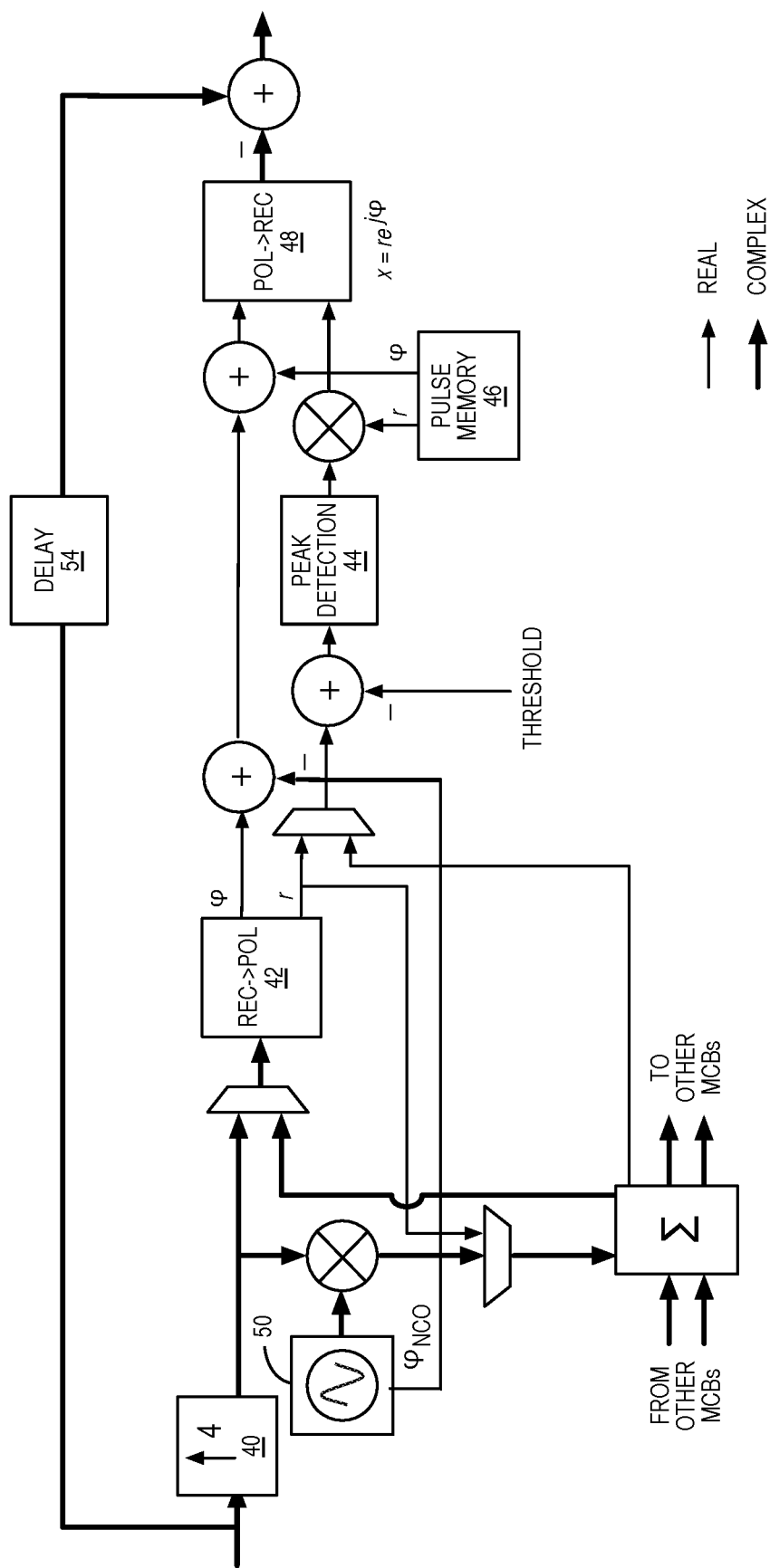
FIG. 14 illustrates an operation of a multi-band transmitter where the peaks can be detected in a coherent way or a non-coherent way according to some embodiments of the present disclosure.

FIG. 14 illustrates an operation of a multi-band transmitter 28 where the peaks can be detected in a coherent way or a non-coherent way according to some embodiments of the present disclosure. As discussed above in relation to FIG. 8, in some embodiments the multi-band transmitter 28 determines whether to perform coherent peak detection or non-coherent peak detection based on a frequency distance corresponding to a difference of carrier frequencies of each of the combinations of the first band input signal and the at least one additional band input signal. As shown in FIG. 14, the addition of multiplexers allows this circuitry to perform both methods of peak detection. For instance, if non-coherent peak detection is selected, then the summation before peak detection 44 is chosen to contain only the absolute values of the signals. Otherwise, if coherent peak detection is selected, the signals are added before entering the rectangular to polar converter 42. This enables the coherent addition.

Figure 15:
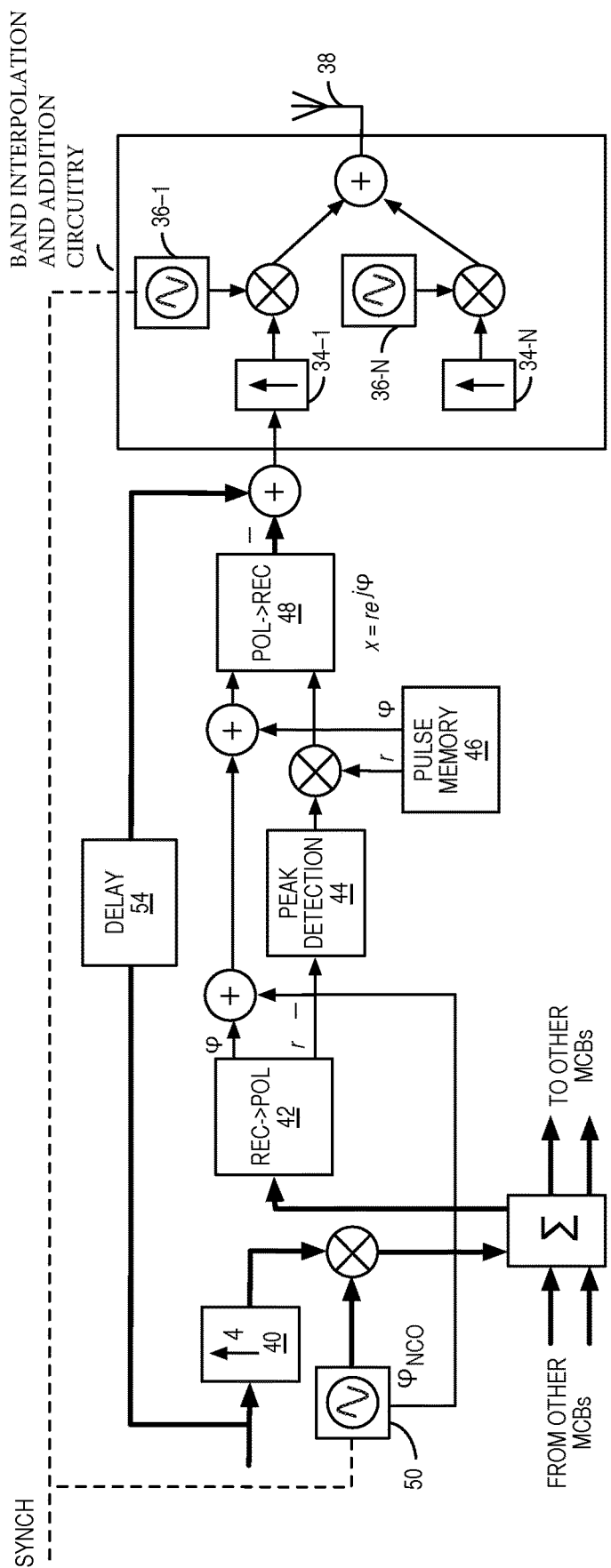
FIG. 15 illustrates additional circuitry that may be included in the multi-band transmitter according to some embodiments of the present disclosure.

FIG. 15 illustrates additional circuitry that may be included in the multi-band transmitter 28 according to some embodiments of the present disclosure. In some embodiments, the oscillator 50 (e.g., an NCO) is synchronized with the relevant oscillator 34 later in the chain where bands are combined (at a four-times-higher sampling rate). Note also that there may be an extra phase compensation included to transfer back the frequency of the summated signals which is included in the rightmost adder.

Figure 16:
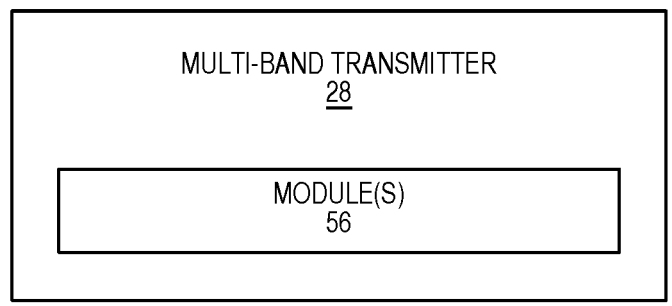
FIG. 16 illustrates a multi-band transmitter that includes modules according to some embodiments of the present disclosure.

FIG. 16 illustrates a multi-band transmitter 28 that includes modules according to some embodiments of the present disclosure. Modules 56 are operative to receive a first band input signal for a first frequency band of the multi-band transmit signal; receive at least one additional band input signal for a respective at least one additional frequency band of the multi-band transmit signal; and detect a peak of a combination of the first band input signal and the at least one additional band input signal taking into account phase information of the first band input signal and the at least one additional band input signal.

The following acronyms are used throughout this disclosure.

3GPP Third Generation Partnership Project
 5G Fifth Generation
 ASIC Application-Specific Integrated Circuit
 CFR Crest Factor Reduction
 eNodeB Evolved NodeB
 EVM Error Vector Magnitude
 GSM Global System for Mobile communication
 LTE Long Term Evolution
 M2M Machine-to-Machine
 MCB Multi-Carrier Branch
 MSR Multi-Standard Radio
 MTC Machine Type Communication
 NCO Numerically Controlled Oscillator
 PA Power Amplifier
 PAR Peak-to-Average Ratio
 RAT Radio Access Technology
 UE User Equipment
 WCDMA Wide Band Code Division Multiple Access Those skilled in the art will recognize improvements and modifications to the embodiments of the present disclosure. All such improvements and modifications are considered within the scope of the concepts disclosed herein and the claims that follow.

What is claimed is:

1. A method of operation of a multi-band transmitter for detecting peaks in a multi-band transmit signal which includes a plurality of transmit signals on a respective plurality of frequency bands, the method comprising:
   receiving a first band input signal for a first frequency band of the multi-band transmit signal;
   receiving one additional band input signal for a respective one additional frequency band of the multi-band transmit signal;
   moving the first band input signal and the one additional band input signal to symmetric locations with a frequency distance corresponding to a difference of carrier frequencies of a combination of the first band input signal and the one additional band input signal; and
   detecting a peak of the combination of the first band input signal and the one additional band input signal taking into account phase information of the first band input signal and the one additional band input signal.

2. The method of claim 1 wherein receiving the first band input signal comprises receiving the first band input signal in a first Multi-Carrier Branch, MCB, of the multi-band transmitter and receiving the one additional band input signal comprises receiving the one additional band input signal in a corresponding one additional MCB of the multi-band transmitter.

3. The method of claim 1 further comprising:
   prior to detecting the peak of the combined signal, upsampling the first band input signal.

4. The method of claim 3 wherein upsampling the first band input signal comprises upsampling the first band input signal by a factor of four.

5. The method of claim 1 further comprising:
   prior to detecting the peak of the combined signal, summing the first band input signal and the one additional band input signal to provide the combined signal that represents the combination of the first band input signal and the one additional band input signal that takes into account the phase information of the first band input signal and the one additional band input signal.

6. The method of claim 1 wherein the peak of the combination is less than a peak that would be determined for the first band input signal without taking into account the phase information.

7. The method of claim 1 wherein detecting the peak of the combination comprises detecting the peak at a point in a signal chain prior to a point where a sample rate is high enough such that the first band input signal and the one additional band input signal can be combined.

8. The method of claim 1 wherein the multi-band transmitter is a Multi-Standard Radio, MSR, transmitter.

9. A multi-band transmitter operative to transmit a multi-band transmit signal which includes a plurality of transmit signals on a respective plurality of frequency bands, comprising:
   a first input configured to receive a first band input signal for a first frequency band of the multi-band transmit signal;
   one additional input configured to receive one additional band input signal for a respective one additional frequency band of the multi-band transmit signal;
   frequency translation circuitry configured to move the first band input signal and the one additional band input signal to symmetric locations with a frequency distance corresponding to a difference of carrier frequencies of a combination of the first band input signal and the one additional band input signal; and
   a peak detecting circuitry configured to detect a peak of the combination of the first band input signal and the one additional band input signal taking into account phase information of the first band input signal and the one additional band input signal.

10. The multi-band transmitter of claim 9 wherein the first input is comprised in a first Multi-Carrier Branch, MCB, and the one additional input is comprised in a corresponding one additional MCB.

11. The multi-band transmitter of claim 9 further comprising upsampling circuitry configured to upsample the first band input signal received by the first input by a factor of four.

12. The multi-band transmitter of claim 9 further comprising:
   adding circuitry configured to sum the first band input signal and the one additional band input signal to provide the combined signal that represents the combination of the first band input signal and the one additional band input signal that takes into account the phase information of the first band input signal and the one additional band input signal.

13. A method of operation of a multi-band transmitter for detecting peaks in a multi-band transmit signal which includes a plurality of transmit signals on a respective plurality of frequency bands, the method comprising:
   receiving a first band input signal and one additional band input signal for a respective one additional frequency band of the multi-band transmit signal;
   determining whether to perform coherent peak detection or non-coherent peak detection based on a frequency distance corresponding to a difference of carrier frequencies of a combination of the first band input signal and the one additional band input signal;
   in response to determining to perform the coherent peak detection:
      moving the first band input signal and the one additional band input signal to symmetric locations with the frequency distance corresponding to the difference of the carrier frequencies of the combination of the first band input signal and the one additional band input signal; and
      detecting a peak of the combination of the first band input signal and the one additional band input signal taking into account phase information of the first band input signal and the one additional band input signal; and
   in response to determining to perform the non-coherent peak detection:
      moving the first band input signal and the one additional band input signal to symmetric locations with the frequency distance corresponding to the difference of the carrier frequencies of the combination of the first band input signal and the one additional band input signal; and
      detecting the peak of the combination of the first band input signal and the one additional band input signal without taking into account the phase information of the first band input signal and the one additional band input signal.

14. The method of claim 13 wherein determining whether to perform the coherent peak detection or the non-coherent peak detection comprises:
   determining to perform the coherent peak detection when the distance corresponding to the difference of the carrier frequencies of the combination of the first band input signal and the one additional band input signal is less than a distance threshold value; and determining to perform non-coherent peak detection when the distance between the first band input signal and the one additional band input signal is not less than the distance threshold value.

\* \* \* \* \*